No. 754,510. PATENTED MAR. 15, 1904.
J. F. SNYDER.
AUTOMATIC BRAKE SHOE FOR BABY CARRIAGES.
APPLICATION FILED APR. 18, 1903.
NO MODEL.
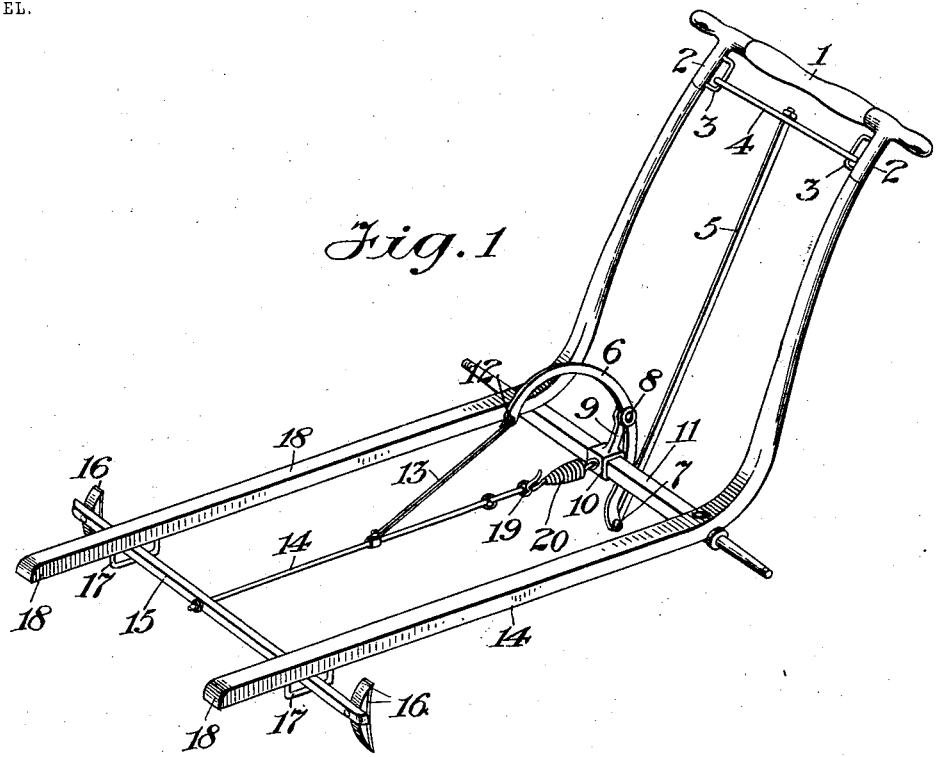

No. 754,510. Patented March 15, 1904.

UNITED STATES PATENT OFFICE.

JOHN FRANK SNYDER, OF NEW YORK, N. Y.

AUTOMATIC BRAKE-SHOE FOR BABY-CARRIAGES.

SPECIFICATION forming part of Letters Patent No. 754,510, dated March 15, 1904.

Application filed April 18, 1903. Serial No. 153,179. (No model.)

*To all whom it may concern:*

Be it known that I, JOHN FRANK SNYDER, a citizen of the United States, and a resident of New York, in the county and State of New York, have invented certain new and useful Improvements in Automatic Brake-Shoes for Baby-Carriages, of which the following is a specification.

The object of my invention is to provide a brake which will at all times bear upon certain wheels of a baby-carriage or similar device unless the said brake is deliberately thrown off the wheels while the carriage is being trundled. This result I accomplish by means of a simple, cheap, and durable mechanism, which will be more fully described below.

One embodiment of my invention is shown in the accompanying drawings, forming a part hereof, in which—

Figure 1 is a perspective view of my improved brake, its actuating mechanism, and the parts of a baby-carriage to which it is attached. Figs. 2 and 3 are detail views of the fulcrum-supporting mechanism.

Corresponding parts in all the figures are denoted by the same reference characters.

A portion of a handle-bar 1, with its supports 2, is shown in Fig. 1, and sliding in guides 3 on the supports 2 is a handle 4, which is parallel to the handle 1. The handle 4 is fixed at its central point to a link 5, which runs substantially parallel to the supports 2 and is secured at its lower end to a bent lever 6 by means of a pivotal connection 7. The bent lever 6 is fulcrumed at 8 on an arm-link 9, which extends upwardly and rearwardly from a clamp 10, which is fixed to the center of the rear axle 11. The free end of the bent lever 6 is pivotally connected at 12 to a link 13, which is connected in a similar manner to a link or rod 14. The rod 14 is secured to a brake-beam 15 at a point near the center thereof, and leather brake-shoes 16 are placed near the ends of said beam 15 at points which enable them to engage the tires of either the front or rear wheels of the carriage. The beam 15 is supported between guides 17 on parallel rods 18 of the carriage, a portion of which are shown.

The rear end of the rod 14 is provided with a loop 19, which is engaged by a coiled spring 20, and the rear end of the coiled spring engages the clamp 10. If desired, this end of the coiled spring may be attached to the axle 11, although it is preferable to attach it as described.

The operation and advantages of my invention will be readily understood. The tension of the spring 20 is such that the brake-shoes 16 are normally held against the tires of the front wheels of the baby-carriage with sufficient force to prevent said wheels from being turned. This prevents the carriage from being moved without considerable force except when the handles 1 and 4 are brought together, when the pivot 7 of the lever 6 is brought upwardly and the end 12 is thrown in a forward and downward direction. This causes the link 13 and rod 14 to be moved forward against the action of the spring 20 until the brake-shoes 16 disengage the tires of the wheels. As long as the shoes 16 are free from the wheels the brake does not act—that is, as long as the handle 4 is against the handle 1 the brake is inoperative; but as soon as the handle 4 is released the spring 20 causes the brake to engage the wheels and prevent further rotation, thus stopping the carriage.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. An automatic brake for baby-carriages, comprising means for engaging a portion of the carriage to prevent its movement, a rod connecting to said engaging means and spring-held to apply the latter, a lever fulcrumed on the carriage and having an arm connected to said rod to actuate the same in a direction to release said engaging means, and means connected to said lever for rocking the latter when the carriage is to be moved.

2. An automatic brake for baby-carriages, comprising means for engaging a portion of the carriage to prevent its movement, a longitudinally-movable rod connected at one end to said engaging means, a pull-spring connected to the other end of said rod and to the carriage whereby to normally apply said engaging means, a lever fulcrumed on the carriage, a link connecting one arm of said lever with said rod, and means, actuated by grasping the handle-bar of the carriage, for rocking the lever whereby to push said rod against the tension of the spring.

3. An automatic brake for baby-carriages, comprising means for engaging a portion of the carriage to prevent its movement, a longitudinally-movable rod connected at one of its ends to said engaging means, a lever fulcrumed intermediate its ends on the carriage, a spring connected to the other end of said rod and to the carriage, a link connecting one arm of said lever with said rod, a movable handle-bar, and a link connecting said handle-bar with the other arm of said lever.

4. An automatic brake for baby-carriages, comprising a brake-beam carrying brake-shoes designed to engage the wheels of the carriage to prevent their movement, a rod connected at one end to said beam, a bracket secured to one of the carriage-axles, a spring connected to the other end of said rod and to said bracket, a lever fulcrumed intermediate its ends on said bracket, a link connecting one arm of said lever with said rod, a movable handle-bar, and a link connecting the other arm of said lever with said handle-bar.

5. An automatic brake for baby-carriages, comprising a brake-beam carrying brake-shoes designed to engage the wheels of the carriage to prevent their movement, a rod connected at one end to said brake-beam, a pull-spring connected to the other end of said rod, a bracket secured to one of the carriage-axles and attached to said spring, said bracket being provided with a fulcrum-arm, a lever fulcrumed on said arm intermediate the ends of the lever, a link connecting one arm of said lever with the said rod, a link connected at one end to the other arm of said lever, and a movable handle-bar mounted adjacent to the usual handle-bar of the carriage and connected to the other end of the last-named link.

In testimony whereof I have signed my name in the presence of the subscribing witnesses.

JOHN FRANK SNYDER.

Witnesses:
J. C. PYBAS,
M. M. DURKIN.